United States Patent
Zhao et al.

(10) Patent No.: US 10,225,534 B2
(45) Date of Patent: Mar. 5, 2019

(54) DEVICE AND METHOD FOR CHARACTERIZATION OF SUBJECTIVE SPECKLE FORMATION

(71) Applicants: Yanning Zhao, Monheim (DE); Frank Schliep, Leverkusen (DE)

(72) Inventors: Yanning Zhao, Monheim (DE); Frank Schliep, Leverkusen (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 30 days.

(21) Appl. No.: 15/251,926

(22) Filed: Aug. 30, 2016

(65) Prior Publication Data

US 2017/0064272 A1    Mar. 2, 2017

(30) Foreign Application Priority Data

Aug. 28, 2015   (DE) .................. 10 2015 114 376

(51) Int. Cl.
| | |
|---|---|
| *G03B 21/14* | (2006.01) |
| *H04N 9/31* | (2006.01) |
| *G02B 27/01* | (2006.01) |
| *G02B 27/48* | (2006.01) |
| *G06T 7/60* | (2017.01) |
| *G06T 5/00* | (2006.01) |
| *G06T 5/40* | (2006.01) |

(52) U.S. Cl.
CPC .......... *H04N 9/3179* (2013.01); *G02B 27/01* (2013.01); *G02B 27/0101* (2013.01); *G02B 27/48* (2013.01); *G06T 5/002* (2013.01); *G06T 5/40* (2013.01); *G06T 7/60* (2013.01); *H04N 9/3129* (2013.01); *H04N 9/3155* (2013.01); *H04N 9/3194* (2013.01); *G02B 2027/012* (2013.01); *G02B 2027/014* (2013.01); *G06T 2207/30168* (2013.01)

(58) Field of Classification Search
CPC .. H04N 9/3179; H04N 9/3194; H04N 9/3129; H04N 9/3155; G06T 7/60; G02B 27/0101; G02B 27/04
See application file for complete search history.

(56) References Cited

U.S. PATENT DOCUMENTS

| | | | | |
|---|---|---|---|---|
| 7,433,512 | B2 * | 10/2008 | Van Der Heide | ....... G06T 5/001 348/E5.081 |
| 9,226,661 | B2 * | 1/2016 | Thompson | ........... A61B 5/0059 |
| 2007/0071292 | A1 | 3/2007 | Rao et al. | |
| 2010/0245937 | A1 | 9/2010 | Edwards et al. | |
| 2012/0071769 | A1 * | 3/2012 | Dunn | ................... A61B 5/0059 600/504 |
| 2012/0200832 | A1 | 8/2012 | Imai | |
| 2014/0193095 | A1 * | 7/2014 | Choe | ...................... G06T 5/002 382/274 |
| 2014/0316284 | A1 * | 10/2014 | Rege | .................... A61B 5/0261 600/479 |

* cited by examiner

*Primary Examiner* — William C. Dowling
(74) *Attorney, Agent, or Firm* — Quinn IP Law

(57) ABSTRACT

The invention concerns a device for characterization of subjective speckle formation, especially for quantification of the speckle contrast. The device has a projection surface (9) and a coherent or partly coherent light source (10) for projecting of an image onto the projection surface (9), a detection unit (11) for generating of speckle images (13) of the image projected onto the projection surface (9), as well as a data acquisition and analysis unit (12) for processing and evaluation of image data.

9 Claims, 2 Drawing Sheets

DEVICE AND METHOD FOR CHARACTERIZATION OF SUBJECTIVE SPECKLE FORMATION

CROSS-REFERENCE TO RELATED APPLICATION

This U.S. Patent Application claims priority to DE 10 2015 114 376 3, filed Aug. 28, 2015 entitled "Device and method for characterization of subjective speckle formation," the entire disclosure of the application being considered part of the disclosure of this application and hereby incorporated by reference.

BACKGROUND

The invention concerns a method for the characterization of subjective speckle formation.

Speckle patterns are irregular fine-grained light distributions which occur when optically rough projection surfaces are illuminated with sufficiently coherent light, especially laser light. The optically rough projection surfaces have unevenness on the order of magnitude of the wavelength of the light. The speckle pattern arises in the imaging of a light spot on the projection surface and by interference of the light waves scattered at the unevenness of the projection surface. This produces a spatial structure with randomly distributed intensity maxima and intensity minima, having the stochastic fine structure of the reflecting projection surface. The contrast of the speckle grains is determined by the coherence of the wavelength and the roughness of the projection surface. The speckle pattern disappears when the wavelength of the light decreases significantly below the mean roughness of the projection surface. The size of the speckle grains is dependent on the size of the light spot. The larger the light spot, the more fine the granularity of the speckle pattern.

Lasers are being used increasingly as a light source for optical imaging methods, and because of their high optical efficiency they are especially useful in producing bright pictures with a large color space and high contrast. It is possible to achieve a high image quality with unlimited picture size. The laser beam is scanned across a projection surface in order to show the picture being represented. This so-called laser scanning projection is a highly promising technology for use as a picture generation unit, or PGU, in vehicle applications, such as contact-analog head-up displays.

Head-up displays are arranged, for example, in the region of the front windshield of a motor vehicle. By a head-up display, or HUD, is meant a display system in which the user can maintain the posture of his head or the viewing direction in the original orientation when viewing the displayed information, since the information is projected into the field of vision. HUDs generally have an imaging unit, which generates an image, an optical module, and a projection surface. The optical module directs the image onto the projection surface, which is configured as a light-transparent mirror-reflecting windshield. The driver of the vehicle sees the reflected information of the imaging unit and at the same time the actual surroundings behind the windshield.

Speckle patterns arise during projection methods with lasers or other coherent light sources, which on account of the small picture elements are generally coarse grained and perceived by the viewer as an annoyance.

The prior art offers a few possibilities of preventing or reducing the formation of speckle patterns.

One possibility is presented in US 2012 0200832 A1 for reducing speckle patterns in an image projection unit. Here, a convex shaped lens is arranged in front of the light source, which can be placed at variable distance from the light source. Depending on the thus adjustable focal length of the lens, the coherent light is altered so that a speckle pattern is reduced.

In DE 10 2010 002 161 A1 another method is proposed for reducing speckle patterns. Here, a continuously rotating scattering disk is arranged in front of a coherent light source. In this way, various statistical phase variations are imposed on the light waves, so that various subjective noise components are generated during a period of exposure and a noise-reduced intensity pattern thanks to the time averaging over the period of exposure of the individual noise components is detected by two cameras.

The difficulty of objectively quantifying the speckle intensity resides in the high dependency of the measurement results on the measurement system used. No method for speckle quantification is known in the prior art that makes it possible to objectively assess the picture quality in regard to disruptive spot patterns.

SUMMARY

The problem which the invention proposes to solve is to provide a device and a method for characterization of the subjective speckle formation, especially for quantification of the speckle contrast. The device should quantify an image generated with a laser as the light source, be simple in design, and thus be cheap to manufacture and operate.

The problem is solved by a device and a method with the features of the independent patent claims. Modifications are indicated in the dependent patent claims.

The problem is solved by a device according to the invention for characterization of subjective speckle formation, especially for quantification of the speckle contrast.

The device has a projection surface and a coherent or partly coherent light source for projecting of a picture onto the projection surface, a detection unit for generating of speckle images of the picture projected onto the projection surface, as well as a data acquisition and analysis unit for processing and evaluation of image data.

According to one configuration of the invention, the light source is designed as a laser projector.

The detection unit is preferably configured as a camera.

The problem is furthermore solved by a method according to the invention for characterization of subjective speckle formation, especially for quantification of the speckle contrast. In the method, a speckle contrast is resolved up to a maximum value.

In this, an image is projected onto a projection surface by a projector with a coherent or at least partly coherent light source. Thanks to the coherent light source and the quality of the projection surface, an image is created with a superimposed speckle pattern. With a detection unit, which is formed by a camera or an optical sensor or something of the kind, the projection surface with the speckle pattern is recorded. The images of the projection surface recorded by the detection unit are called speckle images hereafter. Depending on the wavelength of the light emitted by the light source and the pixel size of the detection unit, at first a speckle image is generated and the size of the speckle is calculated. The speckle size can be adapted to the pixel size of the camera by varying the aperture value. For high precision in the quantification of the image quality in relation to a superimposed speckle pattern, a diameter of a speckle should take up more than five pixels. If this is not the case, the aperture value should be adjusted. If the speckle size is more than five pixel sizes, a search is made for the optimal exposure time. For this, the projection surface is recorded with different exposure times of the camera, the exposure times of the detection unit being changed in stepwise manner until an optimal exposure time is achieved, at which a speckle contrast is reduced to a maximum value. The resolving of the speckle contrast down to a maximum value is determined to be such that a maximum value with a plateau is detected in the recorded measurement results of the speckle contrast, and the value of the speckle contrast drops once more at the end of the plateau.

With the optimal exposure time, a plurality of speckle images are recorded and an average speckle image is formed. Likewise, with the optimal exposure time, the dark projection surface not being illuminated is recorded several times and an average dark image is formed. After this, the average dark image is subtracted from the average speckle image. This makes possible a reduction of background illumination noise. After this, an intensity histogram of the speckle pattern is calculated, with the help of which the image quality of the laser projector is analyzed.

According to one modification of the invention, an aperture value is adjusted in dependence on speckle sizes occurring in the speckle image and pixel size dependent on the detection unit.

With the help of a data acquisition and analysis unit, data from the speckle images is advantageously processed and evaluated, especially the intensity values.

The above-presented method for characterization of speckle images makes it possible to simulate the measured speckle results with different measurement layouts. In this way, individual laser projectors can be compared with each other and the preconditions are created for an objective evaluation of the image quality of the different image generation units.

BRIEF DESCRIPTION OF THE DRAWINGS

Further details, features and benefits of embodiments of the invention will emerge from the following description of sample embodiments making reference to the corresponding drawings. There are shown.

DETAILED DESCRIPTION

Figure 1:
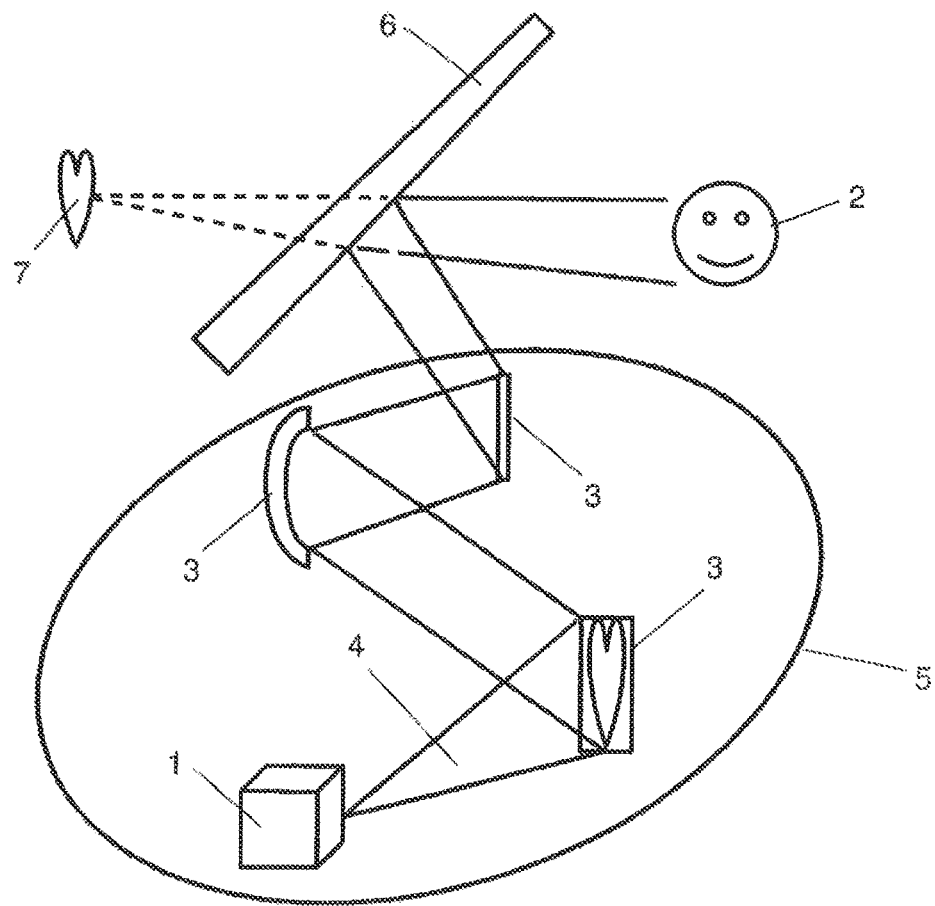
FIG. 1 is a system for generating of an image with an arrangement of optical components for representation of information as a virtual image in a motor vehicle.

FIG. 1 shows a system for generating an image with an image generation unit 1 and an arrangement of optical components 3 for the representing of information as a virtual image 7 in a motor vehicle. The virtual image 7 is projected in the viewing direction of the vehicle driver 2 when looking in the driving direction through the front windshield 6.

The system is arranged with the optical components 3, especially deflection mirrors, inside the dashboard 5. The beam 4 of light rays emitted by the image generation unit 1 is taken across the optical components 3. The beam 7 of light rays emerges from the dashboard 5 through a glare trap, not shown. Another light trap, designed in addition to the glare trap, together with the glare trap prevents the emergence of light rays which might result in irritation and reflections for the vehicle driver 2.

The beam 4 of light rays is deflected onto a predetermined region of the front windshield 6 of the motor vehicle, in which the front windshield 6 is fashioned with optical components for the presentation of the image. The image generation unit 1 and the optical components 3 work in conjunction with the projection region configured on the front windshield 6 as a HUD.

The image generation unit 1 generates the virtual image 7, which is projected onto the mirror-reflecting, light-transparent region of the front windshield 6. The vehicle driver 2 as the user of the front windshield projector sees the reflected information of the image generation unit 1 and at the same time the real surroundings in the viewing direction behind the front windshield 6.

Figure 2:
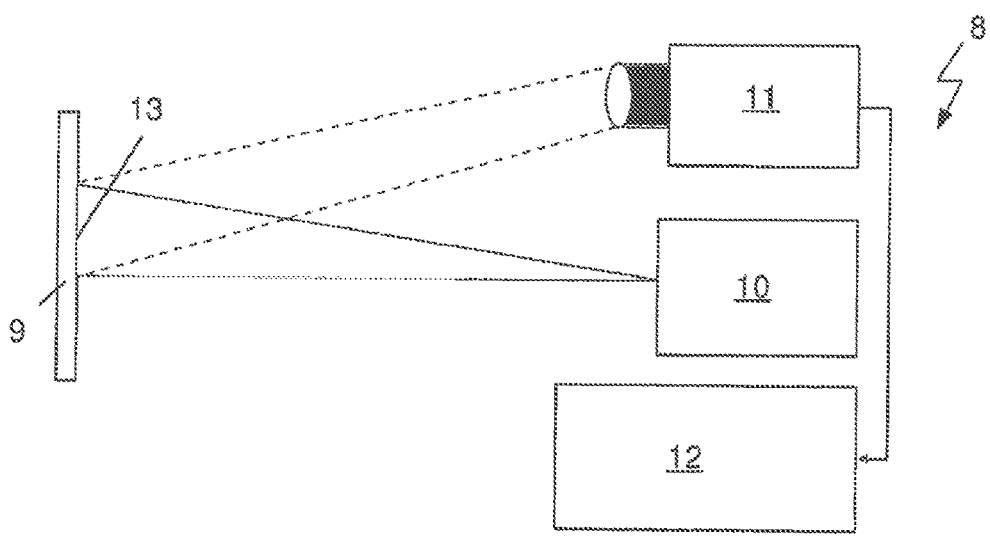
FIG. 2 is a diagram of a device for quantification of the speckle contrast and FIG. 3 is a flow chart of a method for quantification of the speckle contrast

FIG. 2 shows a device 8 for characterization of the subjective speckle contrast, especially for quantification of the speckle contrast. By means of a coherent or partly coherent light source 10, such as a laser projector 10 of an image generation unit 1, an image is projected onto a projection surface 9. This image has a speckle pattern superimposed on it. A detection unit 11, such as a camera 11, generates speckle images 13 of the image with different exposure times T until saturation of the camera 11 is achieved, in order to find an optimal exposure time $T_{opt}$. The optimal exposure time $T_{opt}$ represents a limit value at which the speckle pattern is resolved to a maximum value. The image data, especially the intensity values I, is processed in a data acquisition and analysis unit 12, such as a computer.

Figure 3:
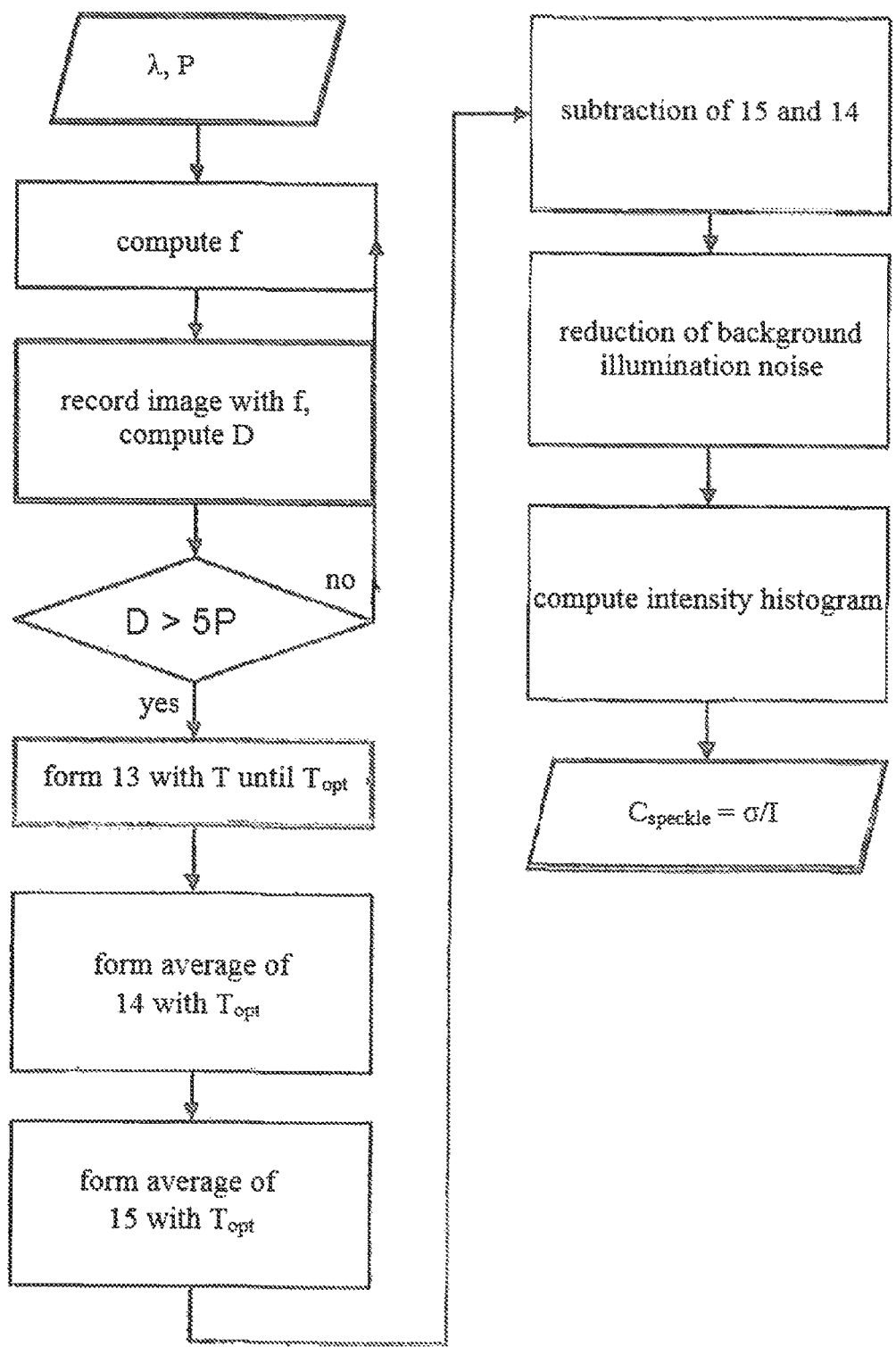

FIG. 3 shows a method for quantification of the speckle contrast and thus characterization of the subjective speckle contrast as a flow chart. Starting from the wavelength λ of the light emitted by the laser projector 10 and the known pixel size P of a camera 11, the minimum aperture value f is calculated. With the camera 11 and the adjusted minimum aperture value f, a speckle image 13 of the projection surface 9 is generated and in this way the speckle size D is computed. The speckle size D can be adapted to the pixel size P of the camera 11 by varying the aperture value f. For a high precision in the quantification of the image quality in regard to a superimposed speckle pattern, a diameter of a speckle being the speckle size D should not occupy more than five pixels P. If this is not the case, the aperture value f should be adjusted. If the speckle size D is more than five pixel sizes P, a search is made for the optimal exposure time $T_{opt}$. For this, the projection surface 9 is recorded with different exposure times T of the camera 11 until saturation of the camera 11. As of a threshold value of the exposure time, or the optimal exposure time $T_{opt}$, the speckle pattern is resolved to a maximum value.

The maximum value of the resolution of the speckle contrast is determined in such a way that the recorded curve of the measurement results of the speckle contrast has a maximum value lying on a plateau and the value of the speckle contrast becomes less once more at the end of the plateau.

With the optimal exposure time $T_{opt}$, a plurality of speckle images 13 are recorded and an average speckle image 14 is formed. Likewise, with the optimal exposure time $T_{opt}$ the dark projection surface 9 not being illuminated is recorded several times and an average dark image 15 is formed. After this, the average dark image 15 of the dark projection surface 9 is subtracted from the average speckle image 14. This makes possible a reduction of background illumination noise. After this, an intensity histogram I is calculated, with the help of which the image quality of the laser projector 10 is analyzed by calculating the speckle contrast $C_{speckle}$ with the standard deviation σ of the intensity I. The method presented in FIG. 3 makes it possible to reproduce the measured speckle results with different measurement layouts. In this way, for example, individual laser projectors can be compared with each other, which creates the preconditions for an evaluation of the image quality of different image generation units.

What is claimed is:

1. Method for characterization of subjective speckle formation, especially for quantification of the speckle contrast, wherein the method involves the following steps:
   projecting of an image onto a projection surface by means of a coherent or partly coherent light source,
   generating of speckle images of the projection surface with a detection unit, wherein exposure times (T) of the detection unit are changed in stepwise manner until an optimal exposure time (Topt), at which a speckle contrast (Cspeckle) is reduced to a maximum value,
   generating of a plurality of speckle images with the optimal exposure time (Topt) and forming of an average speckle image,
   generating of a plurality of images of the projection surface without projected image of the coherent or partly coherent light source with the optimal exposure time (Topt) and forming of an average dark image,
   subtracting of the average dark image from the average speckle image for reduction of background illumination noise,
   forming of an intensity histogram for analysis of the image quality.

2. Method according to claim 1, characterized in that an aperture value (f) is adjusted in dependence on speckle sizes (D) occurring in the speckle image and pixel size (P) dependent on the detection unit.

3. Method according to claim 1 or 2, characterized in that data from the speckle images is processed and evaluated in a data acquisition and analysis unit.

4. An apparatus for characterization of subjective speckle formation, especially for quantification of the speckle contrast, the apparatus comprising:
   at least one processor; and
   at least one memory including computer program code,
   wherein the at least one memory and the computer program code are configured to, with the at least one processor, cause the apparatus at least to:
   project an image onto a projection surface by means of a coherent or partly coherent light source,
   generate speckle images of the projection surface with a detection unit, wherein exposure times (T) of the detection unit are changed in stepwise manner until an optimal exposure time (Topt), at which a speckle contrast (Cspeckle) is reduced to a maximum value,
   generate a plurality of speckle images with the optimal exposure time (Topt) and forming of an average speckle image,
   generate a plurality of images of the projection surface without projected image of the coherent or partly coherent light source with the optimal exposure time (Topt) and forming of an average dark image,
   subtract the average dark image from the average speckle image for reduction of background illumination noise, and
   form an intensity histogram for analysis of the image quality.

5. The apparatus according to claim 4, wherein the at least one memory and the computer program code are configured to, with the at least one processor, cause the apparatus at least to adjust an aperture value (f) in dependence on speckle sizes (D) occurring in the speckle image and pixel size (P) dependent on the detection unit.

6. The apparatus according to claim 4 or claim 5, wherein data from the speckle images is processed and evaluated in a data acquisition and analysis unit.

7. A non-transitory computer-readable medium encoded with instructions that, when executed in hardware, perform a process for characterization of subjective speckle formation, especially for quantification of the speckle contrast, the process comprising:
   projecting an image onto a projection surface by means of a coherent or partly coherent light source,
   generating speckle images of the projection surface with a detection unit, wherein exposure times (T) of the detection unit are changed in stepwise manner until an optimal exposure time (Topt), at which a speckle contrast (Cspeckle) is reduced to a maximum value,
   generating a plurality of speckle images with the optimal exposure time (Topt) and forming of an average speckle image,
   generating a plurality of images of the projection surface without projected image of the coherent or partly coherent light source with the optimal exposure time (Topt) and forming of an average dark image,
   subtracting the average dark image from the average speckle image for reduction of background illumination noise, and
   forming an intensity histogram for analysis of the image quality.

8. The non-transitory computer-readable medium according to claim 7, wherein an aperture value (f) is adjusted in dependence on speckle sizes (D) occurring in the speckle image and pixel size (P) dependent on the detection unit.

9. The non-transitory computer-readable medium according to claim 7 or claim 8, wherein data from the speckle images is processed and evaluated in a data acquisition and analysis unit.

* * * * *